(12) United States Patent
Ahn et al.

(10) Patent No.: US 11,685,433 B2
(45) Date of Patent: Jun. 27, 2023

(54) SYSTEM FOR SENSING HANDS-ON OR OFF OF STEERING WHEEL AND METHOD THEREOF

(71) Applicants: Hyundai Motor Company, Seoul (KR); Kia Motors Corporation, Seoul (KR)

(72) Inventors: Hyoung Jun Ahn, Daegu (KR); Hong Joo Jung, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 715 days.

(21) Appl. No.: 16/568,052

(22) Filed: Sep. 11, 2019

(65) Prior Publication Data

US 2020/0189655 A1   Jun. 18, 2020

(30) Foreign Application Priority Data

Dec. 12, 2018  (KR) .......................... 10-2018-0159643

(51) Int. Cl.
```
B62D 6/08      (2006.01)
B62D 15/02     (2006.01)
B60W 50/08     (2020.01)
G06K 9/00      (2022.01)
G06K 9/62      (2022.01)
G05D 1/00      (2006.01)
```
(Continued)

(52) U.S. Cl.
CPC .............. B62D 6/10 (2013.01); B60W 50/08 (2013.01); B62D 5/006 (2013.01); G01L 5/221 (2013.01); B60W 2510/202 (2013.01)

(58) Field of Classification Search
None
See application file for complete search history.

(56) References Cited

U.S. PATENT DOCUMENTS

2018/0326992 A1\* 11/2018 Aoi ...................... G06K 9/6256
2021/0269089 A1\* 9/2021 Kuenzner ............ B62D 15/025

FOREIGN PATENT DOCUMENTS

DE   102018210320 A1 \* 1/2020   ............. B62D 1/286
JP       2018-001907 A    1/2018
(Continued)

OTHER PUBLICATIONS

Extended European Search Report dated Mar. 12, 2020 for European Patent Application No. 19197185.2.

*Primary Examiner* — Adam D Tissot
*Assistant Examiner* — Laura E Linhardt
(74) *Attorney, Agent, or Firm* — Morgan, Lewis & Bockius LLP (57) ABSTRACT

A system for detecting hands-on or off of a steering wheel and a method thereof, include a direct sensor configured for detecting a hands-on sense value depending on a grip area of the steering wheel; an indirect sensor configured for detecting a hands-on sense value depending on a magnitude of a torque for rotating the steering wheel; and a controller connected to the first sensor and the second sensor and combining a direct hands-on sense value detected by the direct sensor and an indirect hands-on sense value detected by the indirect sensor to each other to determine a grip state of the steering wheel depending on a combined hands-on sense condition, and then to display and warn a result of determining the grip state of the steering wheel through an output unit.

14 Claims, 6 Drawing Sheets

(51) Int. Cl.
*B62D 6/10* (2006.01)
*B62D 5/00* (2006.01)
*G01L 5/22* (2006.01)

(56) References Cited

FOREIGN PATENT DOCUMENTS

JP 2018-052379 A 4/2018
KR 10-2018-0069504 A 6/2018

* cited by examiner

SYSTEM FOR SENSING HANDS-ON OR OFF OF STEERING WHEEL AND METHOD THEREOF

CROSS REFERENCE TO RELATED APPLICATION

The present application claims priority to Korean Patent Application No. 10-2018-0159643, filed on Dec. 12, 2018, the entire contents of which is incorporated herein for all purposes by this reference.

BACKGROUND OF THE INVENTION

Field of the Invention

The present invention relates to a system for detecting hands-on or off of a steering wheel and a method thereof, and more particularly, to a system for detecting hands-on or off of a steering wheel and a method thereof in which hands-on or off detecting rate and accuracy are improved by determining a hands-on or off state by interlocking a direct sensor and an indirect sensor.

Description of Related Art

A torque sensor provided in a motor-driven power steering (MDPS) is a sensor for measuring a steering torque of a steering wheel, and the present torque sensor may be used to indirectly determine whether or not a driver is griping the steering wheel.

That is, torque variation when the driver grips the steering wheel is detected differently from the torque variation when the driver hands off from the steering wheel. Based on such a difference in an amount of the torque variation, it may be determined whether the steering wheel is in a hands-on state (i.e., the state in which the driver grips the steering wheel) or in a hands-off state (i.e., the state in which the driver hands off from the steering wheel).

For example, when an amount of the torque variation detected by the torque sensor is within a predetermined amount of the torque variation section, it is determined to be in the hands-off state.

However, when a position of the steering wheel is changed depending on a tilt-up/tilt-down function of a steering column, there is changed a gap between a dust cover liner of a rubber material surrounding the steering column and a cover covering the steering column, causing an amount of which the dust cover liner is pressed to be increased.

As such a pressed amount of the dust cover liner is increased, friction is additionally increased when a steering shaft connected to the steering wheel is rotated, and accordingly, there occurs an error in which the amount of the torque variation measured by the torque sensor exceeds the predetermined amount of the torque variation even in the hands-off state. The hands-off state may not be accurately determined and accordingly, no hands-off warning is generated.

Moreover, the torque sensor used in the MDPS makes a reference to a torque of a steering gear box and therefore, there occurs a change in the torque of the gearbox when a vehicle wheel travels on a groove recessed in a road, so that the amount of the torque variation is increased. In the present case, the steering wheel is determined to be in the hands-on state even in the hands-off state.

Meanwhile, the amount of the torque variation is not great when the driver grips left and right sides of the steering wheel equally with both hands or holds the steering wheel lightly. In the present case, the steering wheel may be determined to be in the hands-off state even in the hands-on state.

Meanwhile, to directly determine whether the steering wheel is in the hands-on or off state, a sensor may be disposed in the steering wheel and determine whether the driver grips the steering wheel.

However, even when a specific object having a dielectric constant is hung on the steering wheel instead of the driver's hand, the steering wheel may be incorrectly determined to be in the hands-on state. In the present case, no hands-off warning sound is generated even in the hands-off state.

Furthermore, when the driver grips a sensor-less region of the steering wheel, the steering wheel may not be determined to be in the hands-on state. Further, when the driver puts only one finger on the steering wheel or wears gloves, the steering wheel may not be determined to be in the hands-on state since variation in the dielectric constant is small.

Furthermore, the sensor may only determine whether or not the driver simply grips the steering wheel. A plurality of sensors are required to be additionally disposed to determine a grip strength of the steering wheel, and therefore, a manufacturing cost may also be increased.

The information disclosed in this Background of Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a system for detecting hands-on or off of a steering wheel and a method thereof in which hands-on or off detecting rate and accuracy are improved by determining a hands-on or off state by interlocking a direct sensor and an indirect sensor, so that performance of the system is enhanced.

According to an exemplary embodiment in the disclosure, a system for detecting hands-on or off of a steering wheel may include: a direct sensor configured for detecting a hands-on sense value depending on a grip area of the steering wheel; an indirect sensor configured for detecting a hands-on sense value depending on a magnitude of a torque for rotating the steering wheel; and a controller connected to the first sensor and the second sensor and combining a direct hands-on sense value detected by the direct sensor and an indirect hands-on sense value detected by the indirect sensor to each other to determine a grip state of the steering wheel depending on a combined hands-on sense condition, and then to display and warn a result of determining the grip state of the steering wheel through an output unit.

The direct sensor may be provided in a rim portion of the steering wheel; and the hands-on sense value may be detected as a current value changes depending on a grip area of the rim portion.

The indirect sensor may be a torque sensor configured for detecting a rotational torque of a steering shaft connected to the steering wheel.

The controller may be configured to set a plurality of direct hands-on sense regions and a direct hands-off sense region separately from each other depending on a magnitude of the direct hands-on sense value, and a plurality of indirect hands-on sense regions and an indirect hands-off sense region separately from each other depending on a magnitude of the indirect hands-on sense value; detect the hands-on sense regions including input direct and indirect hands-on sense values separately from each other when the direct and indirect hands-on sense values are input thereinto; determine the grip state of the steering wheel from the hands-on sense condition in which the detected hands-on sense regions are combined to each other; and output a signal indicating a determined grip state of the steering wheel.

The controller may include: a storage unit of setting the plurality of direct hands-on sense regions and the direct hands-off sense region separately from each other depending on the magnitude of the direct hands-on sense value, and the plurality of indirect hands-on sense regions and the indirect hands-off sense region separately from each other depending on the magnitude of the indirect hands-on sense value; an input unit of receiving the direct and indirect hands-on sense values each measured by the direct and indirect sensors; a detection unit of detecting the hands-on sense regions including the direct and indirect hands-on sense values input into the input unit separately from each other; a determination unit of determining the grip state of the steering wheel from the hands-on sense condition in which the detected hands-on sense regions are combined to each other; and an output unit of outputting the signal indicating the grip state of the steering wheel determined by the determination unit.

The direct hands-on sense regions may be divided into a direct hands on sense-strong region, a direct hands on sense-middle region, a direct hands on sense-weak region and a direct hands-off sense region depending on the magnitude of the direct hands-on sense value; and the indirect hands-on sense regions may be divided into an indirect hands on sense-strong region, an indirect hands on sense-middle region, an indirect hands on sense-weak region and an indirect hands-off sense region depending on the magnitude of the indirect hands-on sense value.

The steering wheel may be determined to be in a hands-on state when a measured direct hands-on sense value is included in the direct hands-on sense region and a measured indirect hands-on sense value is included in the indirect hands-on sense region.

A hands-off switch counter may generate and accumulate a number when the measured direct hands-on sense value is included in the direct hands on-weak region and the measured indirect hands-on sense value is included in the indirect hands-on sense region; and a current grip state of the steering wheel may be detected and then be displayed and warned to the driver depending on the accumulated number of the hands-off switch counter.

The steering wheel may be determined to be in the hands-on state when the accumulated number of the hands-off switch counter is equal to a reference number or less, and then the hands-on state may be displayed and warned to the driver; and the steering wheel may be determined to be in the hands-off state when the accumulated number of the hands-off switch counter is more than the reference number, and then the hands-off state may be displayed and warned to the driver.

The steering wheel may be determined to be in the hands-off state when the measured direct hands-on sense value is included in the direct hands-off sense region, regardless of the indirect hands-on sense value.

The steering wheel may be determined to be in the hands-off state when the measured indirect hands-on detect is included in the indirect hands-off sense region, regardless of the direct hands-on sense value.

According to another exemplary embodiment in the disclosure, a method of detecting a hands-on or off of a steering wheel may include: detecting a hands-on sense value depending on a grip area of the steering wheel by a direct sensor; detecting a hands-on sense value depending on a magnitude of a torque for rotating the steering wheel by an indirect sensor; and combining a direct hands-on sense value detected by the direct sensor and an indirect hands-on sense value detected by the indirect sensor to each other to determine a hands-on or off state of the steering wheel depending on a combined hands-on sense condition.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, a system for detecting hands-on or off of a steering wheel and a method thereof according to embodiments of the present invention is described with reference to the accompanying drawings.

Figure 1:
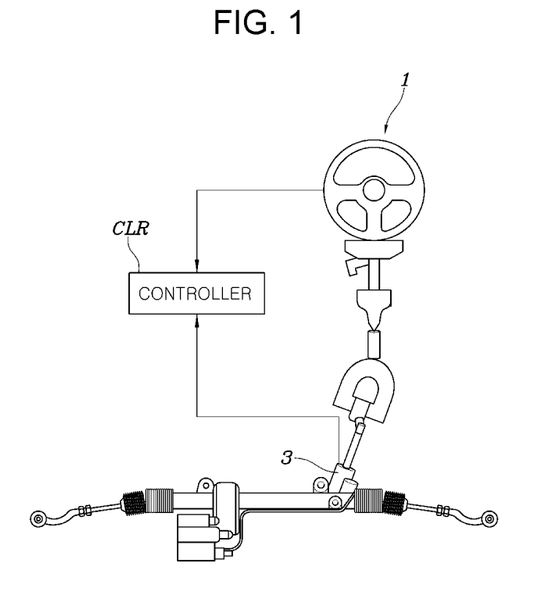
FIG. 1 is a schematic view exemplarily illustrating a system for detecting hands-on or off of a steering wheel according to an exemplary embodiment of the present invention.

According to an exemplary embodiment in the disclosure, a system for detecting hands-on or off of a steering wheel 1 may schematically include a direct sensor 2, an indirect sensor 3 and a controller CLR.

Upon reviewing the present invention in detail with reference to FIG. 1, the direct sensor 2 may be provided in the steering wheel 1 and detect a hands-on sense value depending on a grip area of the steering wheel 1

The indirect sensor 3 may detect a hands-on sense value depending on a magnitude of a torque for rotating the steering wheel 1 and may be a torque sensor used in a motor-driven power steering (MDPS) system.

The controller CLR may serve to combine a direct hands-on sense value detected by the direct sensor 2 and an indirect hands-on sense value 3 detected by the indirect sensor 3 to each other to determine the hands-on or off state of the steering wheel 1 depending on a combined hands-on sense condition.

That is, the direct sensor and the indirect sensor are interlocked to determine whether the steering wheel is in the hands-on or off state. In the present way, determination limitations of the direct and indirect sensors may be complemented each other. As a result, the hands-on or off detecting rate and accuracy are improved, so that performance of the system may be enhanced.

For example, when an object having a dielectric constant is hung on the steering wheel 1, the object is difficult to be distinguished from a driver's hand by the direct sensor 2 alone, but may be distinguished by the indirect sensor 3.

When a steering column is tilted-up or down, friction is additionally increased and therefore, an amount of the torque variation is increased. The present amount of the torque variation is difficult to be distinguished by the indirect sensor 3, i.e., the torque sensor, but may be distinguished by the direct sensor 2.

Figure 2:
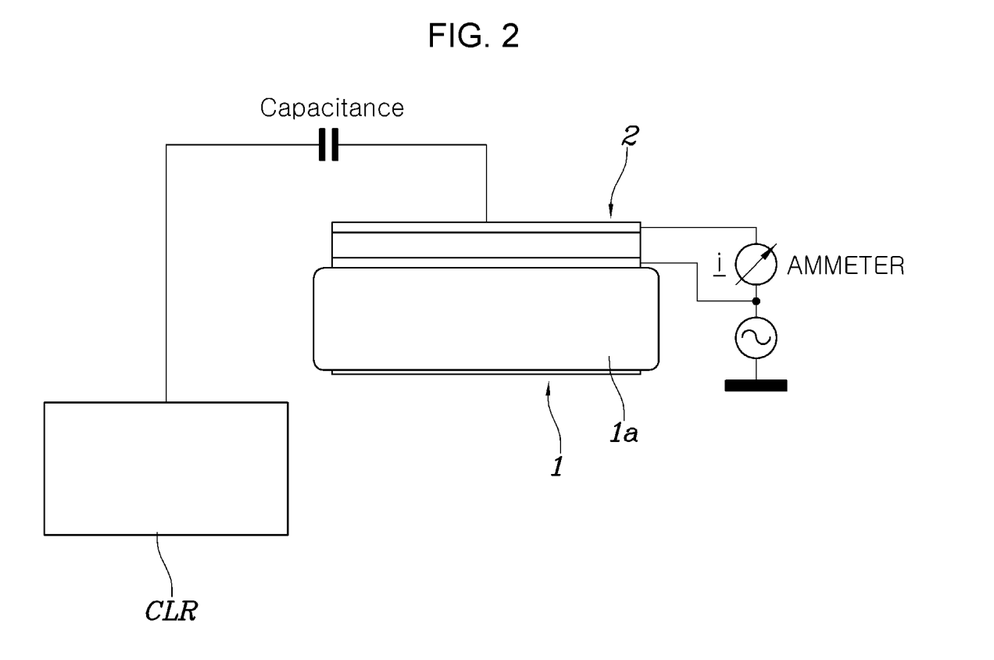
FIG. 2 is a view for explaining a principle of calculating a hands-on sense value detected by a direct sensor according to an exemplary embodiment of the present invention.

As shown in FIG. 2, there is used a principle in which a current value changes according to the grip area of the steering wheel 1 in the direct sensor 2 of the present invention. The direct sensor 2 may be provided in a rim 1a of the steering wheel 1.

The hands-on sense value may be detected as the current value changes depending on the grip area of the rim portion 1a.

That is, the hands-on sense value may be detected by the direct sensor 2 in the hands-on state, and not detected by the direct sensor 2 in the hands-off state.

A contact area of the steering wheel 1 changes depending on a case where the driver grips the steering wheel 1 with his or her both hands, with his or her one hand, or only with his or her fingers. As the grip area of the steering wheel 1 is wider, the current value becomes greater, and accordingly, the hands-on sense value becomes greater.

As shown in FIG. 1, the indirect sensor 3 according to an exemplary embodiment of the present invention may be a torque sensor for detecting a steering torque of the steering wheel 1.

That is, the amount of the torque variation measured by the torque sensor may be detected to be relatively high in the hands-on state, and relatively low in the hands-off state.

Furthermore, according to an exemplary embodiment of the present invention, the hands-on sense values each measured by the direct and indirect sensors 2 and 3 are subdivided depending on the magnitudes thereof and the grip state of the steering wheel 1 may be determined.

For the present purpose, the controller CLR may be configured to set a plurality of direct hands-on sense regions and a direct hands-off sense region separately from each other depending on a magnitude of the direct hands-on sense value, and a plurality of indirect hands-on sense regions and an indirect hands-off sense region separately from each other depending on a magnitude of the indirect hands-on sense value.

The controller CLR may detect the hands-on sense regions including input direct and indirect hands-on sense values separately from each other when the direct and indirect hands-on sense values are input into the hands-on sense regions; and determine the grip state of the steering wheel 1 from the hands-on sense condition in which the detected hands-on sense regions are combined to each other; and output a signal indicating a determined grip state of the steering wheel 1.

Figure 3:
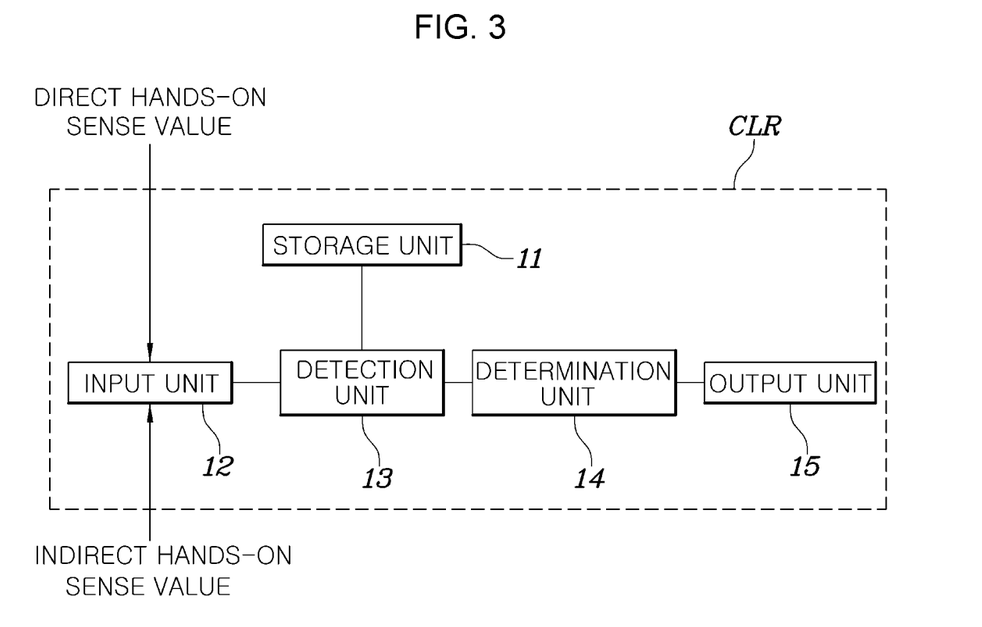
FIG. 3 is a view exemplarily illustrating a constitution of a controller according to an exemplary embodiment of the present invention.

As shown in FIG. 3, the controller CLR may include a storage unit 11, an input unit 12, a detection unit 13, a determination unit 14, and an output unit 15 to realize the above functions.

To be specific, the storage unit 11 may set and store the plurality of direct hands-on sense regions and the direct hands-off sense region separately from each other depending on the magnitude of the direct hands-on sense value, and the plurality of indirect hands-on sense regions and the indirect hands-off sense region separately from each other depending on the magnitude of the indirect hands-on sense value in advance.

The input unit 12 may receive the direct and indirect hands-on sense values each measured by the direct and indirect sensors 2 and 3.

The detection unit 13 may detect hands-on sense regions including the direct and indirect hands-on sense values input into the input unit 12 separately from each other.

The determination unit 14 may determine the hands-on or off state of the steering wheel 1 from the hands-on sense condition in which the detected hands-on sense regions are combined to each other.

The output unit 15 may output the signal indicating the grip state of the steering wheel 1 determined by the determination unit 14 to a cluster or a speaker.

That is, when the direct and indirect hands-on sense values are detected, there may be detected the direct and indirect hands-on sense regions including the direct and indirect hands-on sense values separately from each other depending on the magnitudes of the detected hands-on sense values and a current grip state of the steering wheel 1 may then be determined from a combination of the two detected hands-on sense regions.

Figure 4:
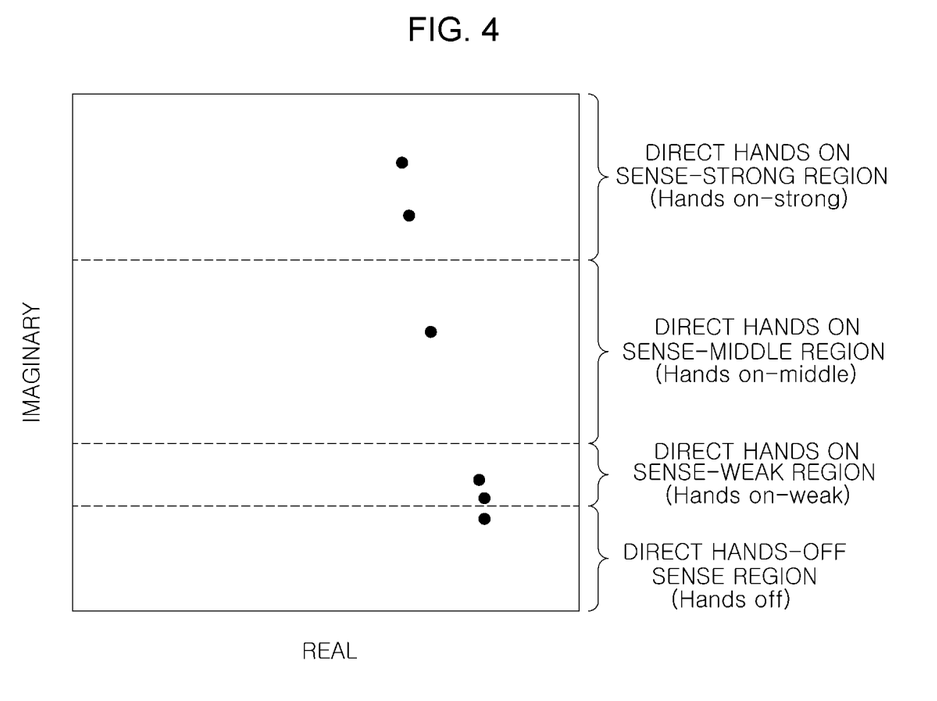
FIG. 4 is a graph illustrating a direct hands-on sense region according to an exemplary embodiment of the present invention.

Referring to FIG. 4, the direct hands-on sense regions may be divided into a direct hands on-strong region, a direct hands on-middle region, a direct hands on-weak region and a direct hands-off region depending on the magnitude of the direct hands-on sense value.

That is, the above regions may be subdivided into regions in which the hands on sense-strong value, hands on sense-middle value, and hands on sense-weak value are detected and a region in which no hands-on sense value is detected depending on the magnitude of the direct hands-on sense value. This is only an exemplary example and the number of the hands-on sense regions may be changed according to a design variable.

Figure 5:
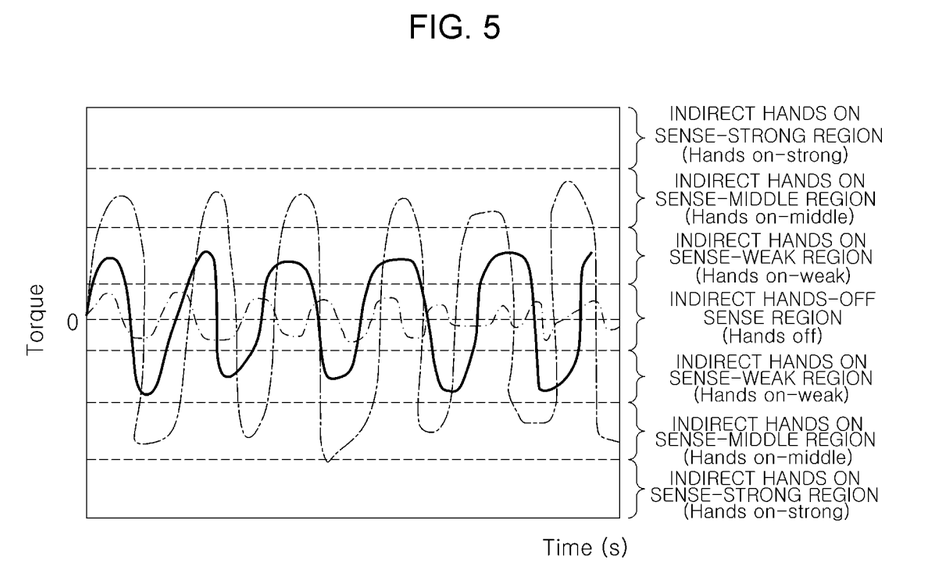
FIG. 5 is a graph illustrating an indirect hands-on sense region according to an exemplary embodiment of the present invention.

Referring to FIG. 5, the indirect hands-on sense regions may be divided into an indirect hands on sense-strong region, an indirect hands on sense-middle region, an indirect hands on sense-weak region and an indirect hands-off sense region depending on the magnitude of the indirect hands-on sense value.

That is, the above regions may be subdivided into the regions in which the hands on sense-strong value, hands on sense-middle value, and hands on sense-weak value are detected and a region in which no hands-on sense value is detected depending on the magnitude of the indirect hands-on sense value. This is only an exemplary example and the number of the hands-on sense regions may be changed according to a design variable.

The controller CLR may determine that the steering wheel is in a hands-on state when a measured direct hands-on sense value is included in the direct hands-on sense region and a measured indirect hands-on sense value is included in the indirect hands-on sense region.

Figure 6:
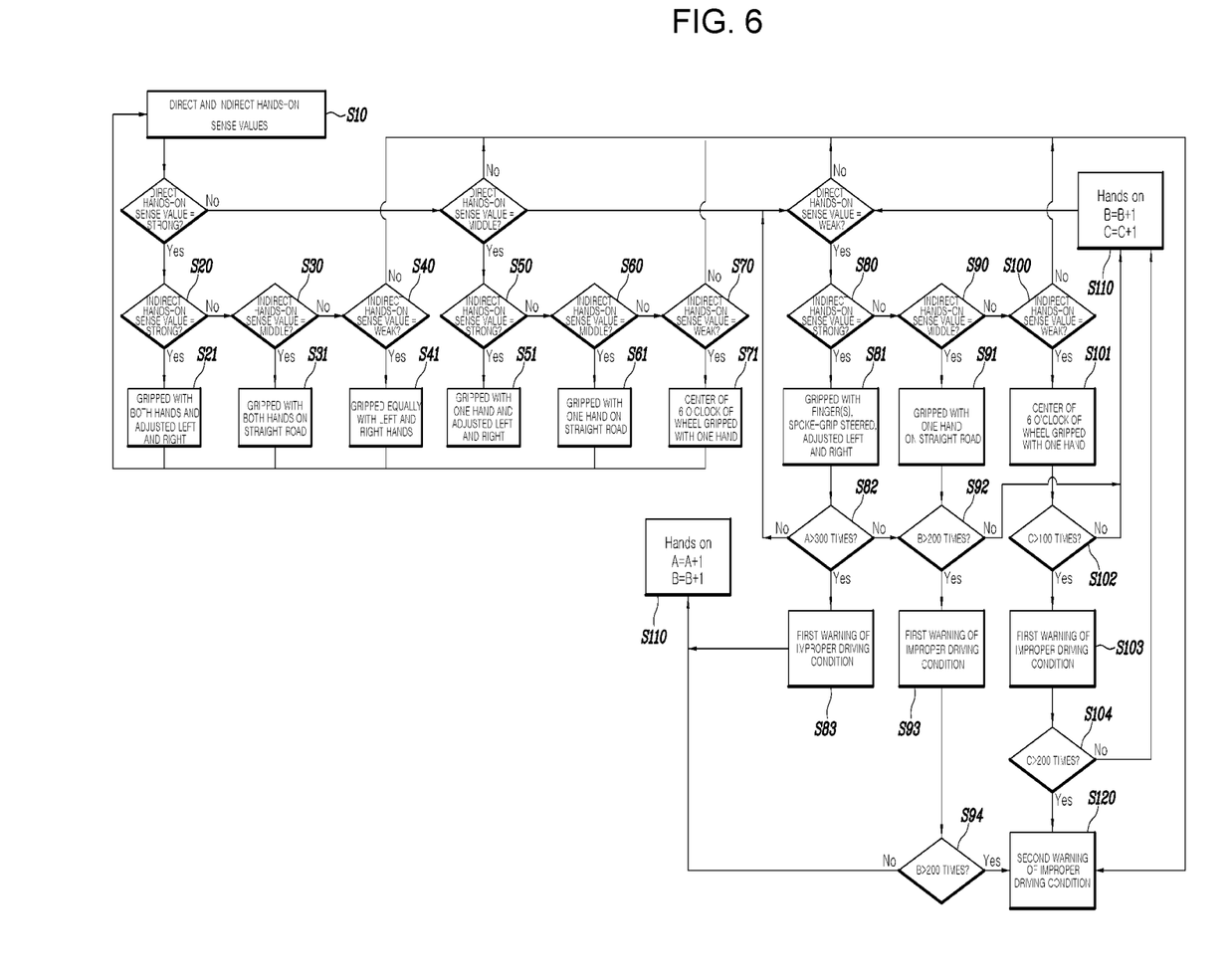
FIG. 6 is a flow chart illustrating a hands-on or off detecting process according to an exemplary embodiment of the present invention.

Referring to FIG. 6, in the controller CLR, a hands-off switch counter may generate and accumulate a number when the measured direct hands-on sense value is included in the direct hands on-weak region and the measured indirect hands-on sense value is included in the indirect hands-on sense region; and detect, display and warn a current grip state of the steering wheel 1 to the driver depending on the accumulated number of the hands-off switch counter.

Here, the contents to be displayed and warned to the driver may be a hands-on state or a hands-off state, and may be displayed on a cluster provided within the vehicle or a warning sound may be generated within the vehicle through a speaker.

To be specific, the steering wheel may be determined to be in the hands-on state when the accumulated number of the hands-off switch counter is equal to a reference number or less, and then the hands-on state may be displayed and warned to the driver.

The steering wheel may be determined to be in the hands-off state when the accumulated number of the hands-off switch counter is more than the reference number, and then the hands-off state may be displayed and warned to the driver.

The controller CLR may determine that the steering wheel is in the hands-off state when the measured direct hands-on sense value is included in the direct hands-off sense region, regardless of the indirect hands-on sense value.

The controller CLR may determine that the steering wheel is in the hands-off state when the measured indirect hands-on sense value is included in the indirect hands-off sense region, regardless of the direct hands-on sense value.

That is, the steering wheel 1 may not be considered to be in the grip state when the hands-on sense value is not measured by either the direct sensor 2 or the indirect sensor 3 regardless of the other hands-on sense value. The controller CLR may determine the above as a hands-off state, and generate a hands-off warning.

Meanwhile, a method of detecting a hands-on or off of a steering wheel may include: detecting a hands-on sense value depending on a grip area of the steering wheel 1 by a direct sensor 2; detecting a hands-on sense value depending on a magnitude of a torque for rotating the steering wheel 1 by an indirect sensor 3; and combining a direct hands-on sense value detected by the direct sensor 2 and an indirect hands-on sense value detected by the indirect sensor 3 to each other to determine a hands-on or off state of the steering wheel 1 depending on a combined hands-on sense condition.

Referring to FIG. 6, it is described a hands-on or off detecting process according to an exemplary embodiment of the present invention. The controller CLR may receive the hands-on sense values each detected by the direct and indirect sensors 2 and 3 in a traveling process of the vehicle and detect the hands-on sense regions including the hands-on sense value separately from each other (S10).

For example, when the direct hands-on sense value is detected to be included in the direct hands on sense-strong region and the indirect hands-on sense value is detected to be included in the indirect hands on sense-strong region (S20), the steering wheel may be determined to be in a hands-on state (S21) in which the driver grips the steering wheel 1 with his or her both hands and adjusts the steering wheel left and right.

When the indirect hands-on sense value is detected to be included in the indirect hands on sense-middle region (S30), the steering wheel may be determined to be in a hands-on state (S31) in which the driver grips the steering wheel 1 with his or her both hands and drives on a straight road.

When the indirect hands-on sense value is detected to be included in the indirect hands on sense-weak region (S40), the steering wheel may be determined to be in a hands-on state (S41) in which the driver grips the steering wheel 1 with his or her both hands, to be specific, equally with his or her left and right hands.

As an exemplary embodiment of the present invention, when the direct hands-on sense value is detected to be included in the direct hands on sense-middle region and the indirect hands-on sense value is detected to be included in the indirect hands on sense-strong region (S50), the steering wheel may be determined to be in a hands-on state (S51) in which the driver grips the steering wheel 1 with his or her one hand, and adjusts the steering wheel left and right.

When the indirect hands-on sense value is detected to be included in the indirect hands on sense-middle region (S60), the steering wheel may be determined to be in a hands-on state (S61) in which the driver grips the steering wheel 1 with his or her one hand and drives on a straight road.

When the indirect hands-on sense value is detected to be included in the indirect hands on sense-weak region (S70), the steering wheel may be determined to be in a hands-on state (S71) in which the driver grips a center portion of a lower end of the steering wheel 1 with his or her one hand.

As an exemplary embodiment of the present invention, when the direct hands-on sense value is detected to be included in the direct hands on sense-weak region and the indirect hands-on sense value is detected to be included in the indirect hands on sense-strong region (S80), the steering wheel may be determined to be in a hands-on state (S81) in which the driver grips the steering wheel 1 with only a portion of his or her one hand or a spoke portion of the steering wheel and adjusts the steering wheel left and right.

In the present case, the hands-off switch counter may generate and accumulate a number to determine (S82) whether an accumulated number A of the hands-off switch counter is more than a first reference number (ex: 300 times). When the accumulated number A of the hands-off switch counter is more than the first reference number, a first warning (S83) may be issued to inform the driver that a vehicle may be switched to the hands-off state. On the other hand, when the accumulated number A of the hands-off switch counter is the first reference number or less, the steering wheel may be determined to be in a hands-on state and the hands-off switch counter accumulates the number (S110).

When the direct hands-on sense value is detected to be included in the direct hands on sense-weak region and the indirect hands-on sense value is detected to be included in the indirect hands on sense-middle region (S90), the steering wheel may be determined to be in a state (S91) in which the driver grips the steering wheel 1 with his or her one hand, and drives on a straight road.

In the present case, the hands-off switch counter may generate and accumulate a number to determine (S92) whether an accumulated number B of the hands-off switch counter is more than a second reference number (ex: 200 times). When the accumulated number B of the hands-off switch counter is more than the second reference number, a first warning (S93) may be issued to inform the driver that the vehicle may be switched to the hands-off state. On the other hand, when the accumulated number B of the hands-off switch counter is the second reference number or less, the steering wheel may be determined to be in a hands-on state and the hands-off switch counter accumulates the number (S110).

Next, it may be determined (S94) whether the accumulated number B of the hands-off switch counter is more than a third reference number greater than the second reference number. When the accumulated number B of the hands-off switch counter is more than the third reference number, a second warning (S120) is issued to inform the driver that the vehicle is switched to the hands-off state. On the other hand, when the accumulated number B of the hands-off switch counter is the third reference number or less, the hands-off switch counter accumulates the number (S110).

For reference, when the hands-on sense condition of the direct hands on sense-weak region and the indirect hands on sense-middle region is maintained even after a predetermined time elapse following the second warning, a function for automatically driving a vehicle such as a cruise control may be controlled to be forcedly terminated.

As an exemplary embodiment of the present invention, when the direct hands-on sense values is detected to be included in the direct hands on sense-weak region and the indirect hands-on sense values is detected to be included in the indirect hands on sense-weak region (S100), the steering wheel may be determined to be in a state (S101) in which the driver grips the lower end of the steering wheel 1 with a part of his or her one hand, and drives on a road.

In the present case, the hands-off switch counter may generate and accumulate a number to determine (S102) whether an accumulated number C of the hands-off switch counter is more than a fourth reference number (ex: 100 times). When the accumulated number C of the hands-off switch counter is more than the fourth reference number, a first warning (S103) may be issued to inform the driver that the vehicle may be switched to the hands-off state. On the other hand, when the accumulated number C of the hands-off switch counter is the fourth reference number or less, the steering wheel may be determined to be in a hands-on state and the hands-off switch counter accumulates the number (S110).

Next, it may be determined (S104) whether the accumulated number C of the hands-off switch counter is more than a fifth reference number greater than the fourth reference number. When the accumulated number C of the hands-off switch counter is more than the fifth reference number, a second warning (S120) is issued to inform the driver that the vehicle is switched to the hands-off state. On the other hand, when the accumulated number C of the hands-off switch counter is the fifth reference number or less, the hands-off switch counter accumulates the number (S110).

For reference, when the hands-on sense condition of the direct hands on sense-weak region and the indirect hands on sense-weak region is maintained even after a predetermined time elapse following the second warning, the function for automatically driving a vehicle such as the cruise control may be controlled to be forcedly terminated.

As described above, the indirect sensor and the direct sensor according to the disclosure are interlocked to determine that the steering wheel is in the hands-on or off state. In the present way, determination limitations of the direct and indirect sensors may be complemented each other. As a result, the hands-on or off detecting rate and accuracy are improved, so that performance of the system may be enhanced.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for detecting hands-on or off of a steering wheel, the system comprising:
    a first sensor detecting a direct hands-on sense value depending on a grip area of the steering wheel;
    a second sensor detecting an indirect hands-on sense value depending on a magnitude of a torque for rotating the steering wheel; and
    a controller connected to the first sensor and the second sensor and combining the direct hands-on sense value detected by the first sensor and the indirect hands-on sense value detected by the second sensor to each other to determine a grip state of the steering wheel depending on a combined hands-on sense condition, and then to display and warn a result of determining the grip state of the steering wheel through an output unit,
    wherein the controller is configured to set a plurality of direct hands-on sense regions and a direct hands-off sense region separately from each other depending on a magnitude of the direct hands-on sense value,
    wherein the controller is configured to set a plurality of indirect hands-on sense regions and an indirect hands-off sense region separately from each other depending on a magnitude of the indirect hands-on sense value,
    wherein the controller is configured to detect hands-on sense regions including the direct and indirect hands-on sense values separately from each other when the direct and indirect hands-on sense values are input into the hands-on sense regions,
    wherein the controller is configured to determine the grip state of the steering wheel from the hands-on sense condition in which the detected hands-on sense regions are combined to each other, and
    wherein the controller is configured to output a signal indicating the grip state of the steering wheel, wherein the direct hands-on sense region is subdivided into a direct hands on sense-strong region, a direct hands on sense-middle region, a direct hands on sense-weak region and a direct hands-off sense region depending on the magnitude of the direct hands-on sense value, wherein the indirect hands-on sense region is subdivided into an indirect hands on sense-strong region, an indirect hands on sense-middle region, an indirect hands on sense-weak region and an indirect hands-off sense region depending on the magnitude of the indirect hands-on sense value, wherein a hands-off switch counter generates and accumulates a number when the measured direct hands-on sense value is included in the direct hands on-weak region and the measured indirect hands-on sense value is included in the indirect hands-on sense region, wherein a current grip state of the steering wheel is detected and then be displayed and warned to a driver depending on the accumulated number of the hands-off switch counter, and wherein the hands-off switch counter is provided to determine the hands-on state and the hands-off state based on whether the accumulated number is greater than a reference number.

2. The system for detecting the hands-on or off of the steering wheel of claim 1,
wherein the first sensor is provided in a rim portion of the steering wheel; and
wherein the direct hands-on sense value is detected as a current value changes depending on a grip area of the rim portion.

3. The system for detecting the hands-on or off of the steering wheel of claim 1,
wherein the second sensor is a torque sensor configured for detecting a rotational torque of a steering shaft connected to the steering wheel.

4. The system for detecting the hands-on or off of the steering wheel of claim 1, wherein the controller includes:
a storage unit of setting the plurality of direct hands-on sense regions and the direct hands-off sense region separately from each other depending on the magnitude of the direct hands-on sense value, and the plurality of indirect hands-on sense regions and the indirect hands-off sense region separately from each other depending on the magnitude of the indirect hands-on sense value;
an input unit of receiving the direct and indirect hands-on sense values each measured by the first sensor and the second sensor;
a detection unit connected to the storage unit and the input unit and of detecting the hands-on sense regions including the direct and indirect hands-on sense values input into the input unit separately from each other;
a determination unit connected to the detection unit and of determining the grip state of the steering wheel from the hands-on sense condition in which the detected hands-on sense regions are combined to each other; and
an output unit connected to the determination unit and of outputting the signal indicating the grip state of the steering wheel determined by the determination unit.

5. The system for detecting the hands-on or off of the steering wheel of claim 1,
wherein the steering wheel is determined to be in a hands-on state when the measured direct hands-on sense value is included in the direct hands-on sense region and the measured indirect hands-on sense value is included in the indirect hands-on sense region.

6. The system for detecting the hands-on or off of the steering wheel of claim 1,
wherein the steering wheel is determined to be in a hands-on state when the accumulated number of the hands-off switch counter is equal to the reference number or less, and then the hands-on state is displayed and warned to the driver; and
wherein the steering wheel is determined to be in a hands-off state when the accumulated number of the hands-off switch counter is more than the reference number, and then the hands-off state is displayed and warned to the driver.

7. The system for detecting the hands-on or off of the steering wheel of claim 1,
wherein the steering wheel is determined to be in a hands-off state when the measured direct hands-on sense value is included in the direct hands-off sense region, regardless of the indirect hands-on sense value.

8. The system for detecting the hands-on or off of the steering wheel of claim 1,
wherein the steering wheel is determined to be in a hands-off state when the measured indirect hands-on sense is included in the indirect hands-off sense region, regardless of the direct hands-on sense value.

9. A method of detecting a hands-on or off of a steering wheel, the method comprising:
detecting, by a first sensor, a direct hands-on sense value depending on a grip area of the steering wheel;
detecting, by a second sensor, an indirect hands-on sense value depending on a magnitude of a torque for rotating the steering wheel; and
combining, by a controller, the direct and indirect hands-on sense values each detected by the first sensor and the second sensor to each other to determine a hands-on or off state of the steering wheel depending on a combined hands-on sense condition,
wherein the controller is configured to output a signal indicating the determined hands-on or off state of the steering wheel,
wherein the controller is configured to set a plurality of direct hands-on sense regions and a direct hands-off sense region separately from each other depending on a magnitude of the direct hands-on sense value,
wherein the controller is configured to set a plurality of indirect hands-on sense regions and an indirect hands-off sense region separately from each other depending on a magnitude of the indirect hands-on sense value,
wherein the controller is configured to detect hands-on sense regions including the direct and indirect hands-on sense values separately from each other when the direct and indirect hands-on sense values are input into the hands-on sense regions,
wherein the controller is configured to determine a grip state of the steering wheel from the hands-on sense condition in which the detected hands-on sense regions are combined to each other,
wherein the direct hands-on sense region is subdivided into a direct hands on sense-strong region, a direct hands on sense-middle region, a direct hands on sense-weak region and a direct hands-off sense region depending on the magnitude of the direct hands-on sense value,
wherein the indirect hands-on sense region is subdivided into an indirect hands on sense-strong region, an indirect hands on sense-middle region, an indirect hands on sense-weak region and an indirect hands-off sense region depending on the magnitude of the indirect hands-on sense value, wherein a hands-off switch counter generates and accumulates a number when the measured direct hands-on sense value is included in the direct hands on-weak region and the measured indirect hands-on sense value is included in the indirect hands-on sense region, wherein a current grip state of the steering wheel is detected and then be displayed and warned to a driver depending on the accumulated number of the hands-off switch counter, and wherein the hands-off switch counter is provided to determine the hands-on state and the hands-off state based on whether the accumulated number is greater than a reference number.

10. The method of detecting the hands-on or off of the steering wheel of claim 9, further comprising:

displaying and warning a result of determining the hands-on or off state of the steering wheel.

11. The method of detecting the hands-on or off of the steering wheel of claim 9, wherein the steering wheel is determined to be in the hands-on state when the direct hands-on sense value is included in the direct hands-on sense region and the indirect hands-on sense value is included in the indirect hands-on sense region.

12. The method of detecting the hands-on or off of the steering wheel of claim 9, wherein the steering wheel is determined to be in the hands-off state when the detected direct hands-on sense value is included in the direct hands-off sense region, regardless of the indirect hands-on sense value.

13. The method of detecting the hands-on or off of the steering wheel of claim 9, wherein the steering wheel is determined to be in the hands-off state when the detected indirect hands-on sense is included in the indirect hands-off sense region, regardless of the direct hands-on sense value.

14. The method of detecting the hands-on or off of the steering wheel of claim 9, wherein the steering wheel is determined to be in the hands-on state when the accumulated number of the hands-off switch counter is equal to the reference number or less, and then the hands-on state is displayed and warned to the driver; and wherein the steering wheel is determined to be in the hands-off state when the accumulated number of the hands-off switch counter is more than the reference number, and then the hands-off state is displayed and warned to the driver.

* * * * *